March 25, 1969  C. LOMBARD  3,435,165
ELECTRIC CONTACT UNITS OF CABLE CONTROL DEVICES
Filed Nov. 2, 1967
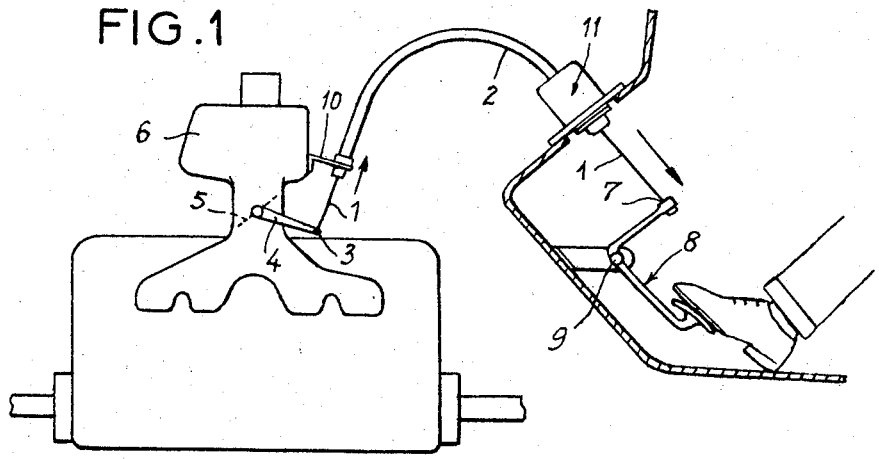
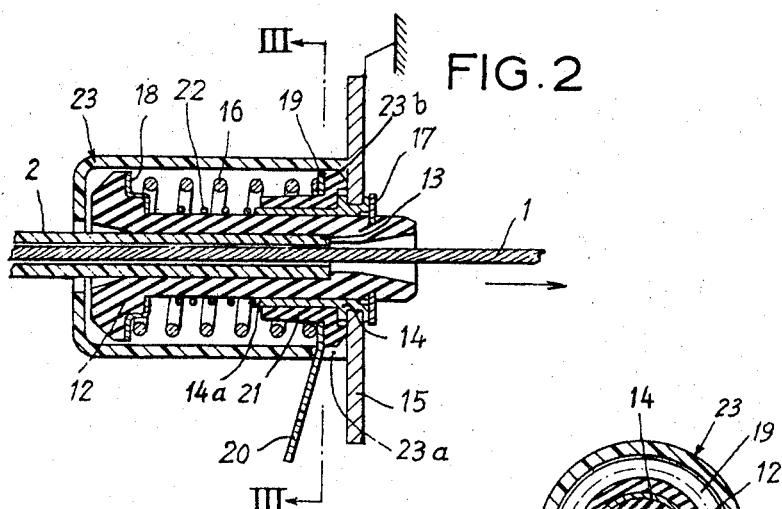
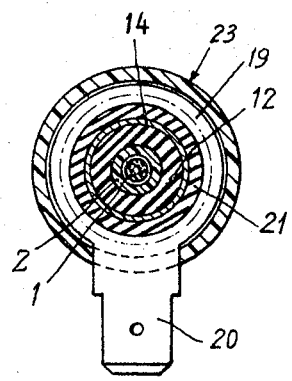
INVENTOR
CLAUDE LOMBARD
By Stevens, Davis, Miller & Mosher
ATTORNEYS

United States Patent Office 3,435,165
Patented Mar. 25, 1969

3,435,165
ELECTRIC CONTACT UNITS OF CABLE CONTROL DEVICES
Claude Lombard, Billancourt, France, assignor to Regie Nationale des Usines Renault Billancourt and Automobiles Peugeot, Billancourt, and Paris, France
Filed Nov. 2, 1967, Ser. No. 680,057
Claims priority, application France, Dec. 27, 1966, 88,897
Int. Cl. H01h *17/10*
U.S. Cl. 200—61.89        2 Claims

ABSTRACT OF THE DISCLOSURE

An electric contact unit for cable control device, notably an accelerator cable control device having a protection sheath as provided in automotive vehicles and machines, especially those equipped with an automatic transmission mechanism, said contact unit being adapted to operate as a sheath length compensator preventing by its resilient action any overload of the accelerator cable in the fully depressed accelerator pedal position.

---

This invention is concerned with electric contact units of control devices of the sheathed cable type wherein the cable is operated from an abutment position. More particularly, this invention relates to an electric contact unit of cable control device, notably the accelerator throttle control cable and its sheath, as frequently used in automotive vehicles and earthmoving or transport machines or vehicles, notably in vehicles equipped with an automatic transmission mechanism, said contact unit constituting the sheath length compensator in that its resilient action prevents the sheath of the accelerator cable from being overloaded when the accelerator pedal is fully depressed, and being characterised in that a mushroom-shaped insulating member receiving the sheath reaction is movable against the resistance of a pair of concentric coil compression springs, one spring constantly exerting its resilient force between a metal shouldered annular member disposed under the head of said mushroom-shaped member and a circular insulated member formed with a tubular stem and connected to one terminal of the circuit to be controlled, the other spring being slidably mounted on the tubular stem of said circular insulated member and adapted in the fully-depressed accelerator pedal position to close an electric contact between said shouldered annular member and a metal tubular member electrically connected to the other terminal and adapted to guide said circular insulated member during its axial movement.

This invention is particularly and advantageously applicable to automotive vehicles equipped with an electrically controlled automatic transmission mechanism and having a flexible sheathed cable controlling the accelerator throttle valve by means of a pedal, and wherein it is already known per se to provide an electric contact unit adapted to be operated by the accelerator pedal in a position beyond the maximum acceleration position for controlling a change in the conditions of operation of the transmission mechanism (notably when it is required to increase the vehicle speed at which a gear change normally takes place when a control overstroke of the pedal is produced, for example for overtaking or driving uphill). However, it is clear that this invention is also applicable to any flexible cable control device, whether manually operated or responsive to a servomechanism, and in this last instance the electric contact unit may advantageously be utilized for stopping the servomechanism in response to the actual stoppage of the controlled member, the compensator function preventing the cable overload as already explained hereinabove.

A typical form of embodiment of a cable control arrangement according to this invention will now be described by way of example with reference to the accompanying drawing in which:

FIGURE 1 is a diagrammatic general view showing a cable control device for actuating the accelerator of an automotive vehicle, which incorporates the contact unit according to this invention;

FIGURE 2 is an axial section showing the contact unit on a larger scale, and

FIGURE 3 is a cross-section taken along the line III—III of FIGURE 2.

The engine accelerator control arrangement illustrated in the drawing comprises a flexible metal cable 1 enclosed on the greater part of its length in a flexible sheath 2 usually of reinforced plastic material. One end of the cable 1 is attached at 3 to a control lever 4 rigid with the accelerator throttle valve 5 of a carburetor 6, and the other end is anchored at 7 to the accelerator pedal 8 fulcrumed at 9 on a support rigid with the body of the vehicle. A return spring (not shown) constantly urges in the usual manner the throttle valve 5 to its choke-tube closing position shown in the figure; in other words, the throttle valve is opened by pulling the cable in the direction shown by the arrow, i.e. by depressing the pedal 8.

The sheath 2 bears with one end against a bracket 10 secured to the carburetor and with the other end against the contact device of this invention which is secured to the vehicle body and designated by the reference numeral 11 in FIGURE 1.

Referring to the more detailed FIGURE 2 it will be seen that the flexible cable 1 and sheath 2 extend through a plastic insulating mushroom-shaped member 12 of which the hollow stem is formed with an inner shoulder 13 constituting a stop for the corresponding end of the sheath and is slidably mounted in a metal guide member 14 riveted or crimped on a fastening plate 15 rigid with the vehicle body. The head of the mushroom-shaped member 12 receives the pressure of a pre-stressed spring 16 disposed on one side of plate 15 and is retained on said plate by an axial stop ring, for example a circlip, 17 engaging a groove formed in the tubular stem of said mushroom-shaped member 12 and bearing with one face against said metal guide member 14.

The prestressed spring 16 actually reacts between a metal shouldered annular member or washer 18 fitting to the underside of member 12 and a metal washer 19 formed with an integral radial lug extension 20 which is carried by a shouldered plastic ring 21 adapted electrically to insulate the guide member 14 from the plate 15. The guide member 14 projects slightly at 14a from the ring member 21 and the tubular stem of member 12 is surrounded along one fraction of its length by another coil compression spring 22 adapted to constitute an electric contact member between said guide member 14 and the washer 18 beyond a predetermined compression of the main spring 16; thus, an electrical circuit is closed between the fastening plate 15 and the washer 19 formed with the lug 20 via the conducting members 14, 22, 18 and 16. The various component elements of this electrical connection are preferably made of stainless, or moderately oxidizable, or duly protected metals, the parts 18, 20 and 15 being adapted to be connected to the two poles of a circuit element wherein the device of this invention will act as an electric contact unit or switch, under the conditions to be set forth presently. The device may be protected by a cover 23 of flexible plastic material, formed with an axial opening permitting the passage of the cable-containing flexible sheath and with a notch 23a through which the radial lug 20 may project to the outside, this cover 23 having an inner bead 23b adapted to be clamped between a corresponding portion of the shouldered ring 21 and the plate 15.

The function of the above-described device in the control arrangement illustrated in FIGURE 1 will be readily understood, considering the fact that the main spring 16 is relatively stiff but less than the cable and sheath assembly, so that when the throttle valve 5 is fully open as a consequence of a first stroke of the accelerator pedal 8 and the latter is further depressed, the cable fastening point 3 thus becoming fixed, the cable length will decrease between the bracket 10 and the device 11, and the sheath 2, by compensation, will exert a thrust against the mushroom-shaped member 12 and compress the main spring 16; it will be noted that this compression may be continued beyond the point whereat the electric contact is closed between members 18, 22 and 14, since the function of spring 22 is to permit this additional compression. Therefore, the device according to the present invention acts jointly as an electric contact unit or contactor or switch and as a control compensator.

Of course, various modifications and variations may be brought to the specific form of embodiment shown and described herein by way of example without inasmuch departing from the spirit and scope of the invention.

I claim:

1. An electric contact unit for a cable control device, notably an accelerator cable control device having a protection sheath, said contact unit operating as a sheath length compensator preventing by its resilient action any overload of the accelerator cable in the fully depressed accelerator pedal position, and comprising a mushroom-shaped insulating member receiving the thrust from the cable sheath movable against the elastic resistance of a pair of concentric coil compression springs of which one is prestressed so as to exert a constant thrust against a metal shouldered annular member disposed under the head of said mushrom-shaped insulating member and a circular insulated member formed with a tubular stem and connected to one terminal of the circuit to be controlled, the other spring slidably mounted on said tubular stem of said circular insulated member and adapted in the fully-depressed accelerator pedal position to close an electric contact between said shouldered annular member and a metal tubular member electrically connected to the other terminal and adapted to guide said circular insulated member during its axial movement.

2. Contact unit according to claim 1, characterised in that said metal tubular member guiding said circular insulated member is crimped on the mounting plate of the contact unit which further carries the protection sheath thereof.

References Cited
UNITED STATES PATENTS

| | | | |
|---|---|---|---|
| 2,863,962 | 12/1958 | Letteney | 200—61.89 |
| 2,918,652 | 12/1959 | Epstein | 200—61.89 |
| 3,273,552 | 9/1966 | Plath | 200—61.89 |
| 3,322,226 | 5/1967 | Marshall et al. | 200—61.89 |
| 3,336,450 | 8/1967 | Rainier | 200—61.89 |

ROBERT K. SCHAEFER, *Primary Examiner.*

H. O. JONES, *Assistant Examiner.*